C. L. AYGARN.
VEHICLE DUMP.
APPLICATION FILED SEPT. 21, 1912.
1,120,358.
Patented Dec. 8, 1914.
3 SHEETS—SHEET 3.
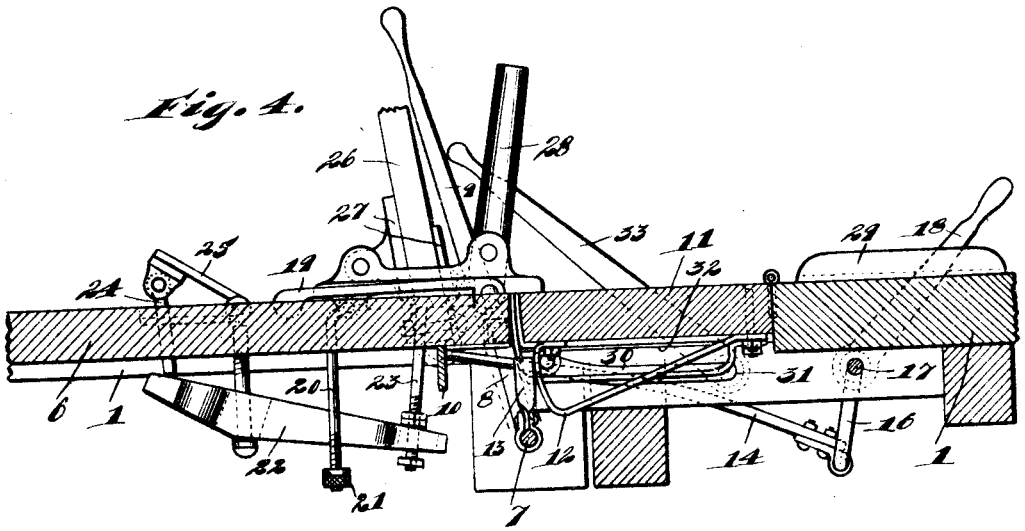
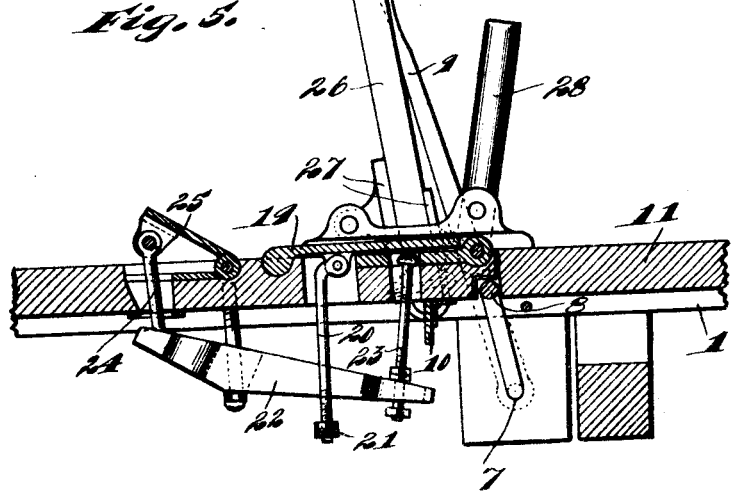

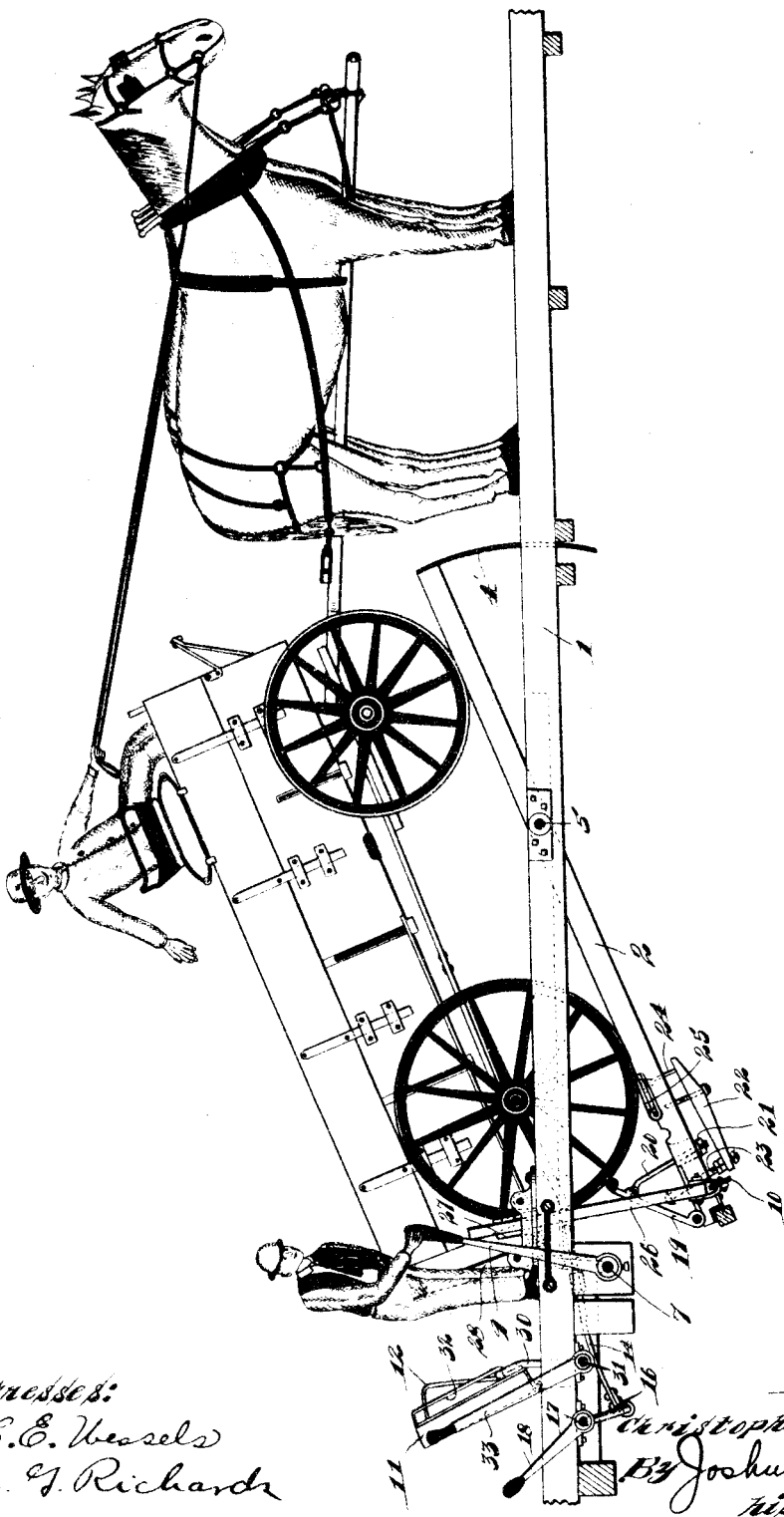

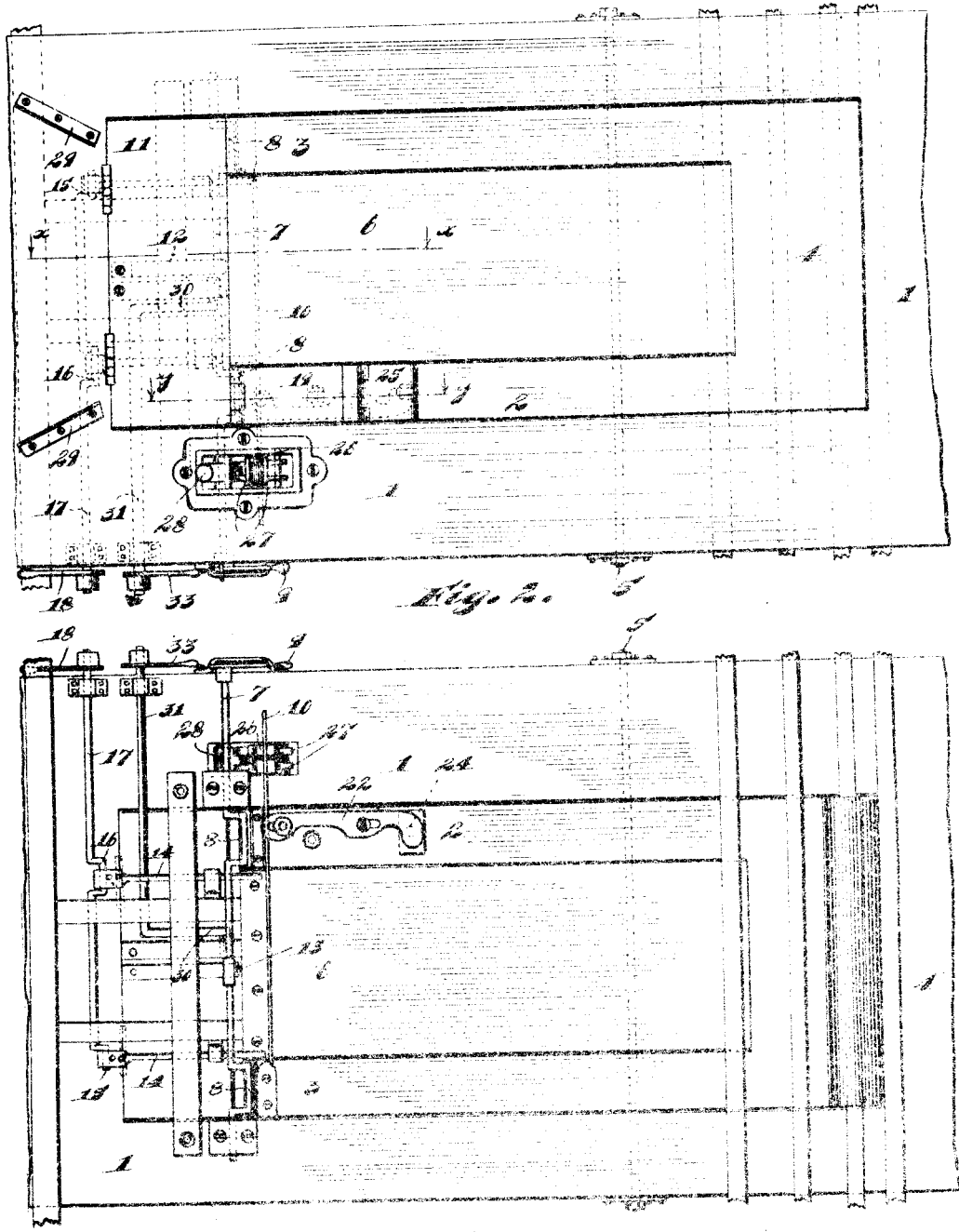

UNITED STATES PATENT OFFICE.

CHRISTOPHER L. AYGARN, OF SENECA, ILLINOIS.

VEHICLE-DUMP.

1,120,358. Specification of Letters Patent. Patented Dec. 8, 1914.

Application filed September 24, 1913. Serial No. 791,455.

*To all whom it may concern:*

Be it known that I, CHRISTOPHER L. AYGARN, a citizen of the United States, and a resident of the city of Seneca, county of La Salle, and State of Illinois, have invented certain new and useful Improvements in Vehicle-Dumps, of which the following is a specification.

My invention relates to improvements in vehicle dumps and has for its object the provision of an improved construction of this character which is safe and efficient in operation.

A further object of the invention is to provide a vehicle dump adapted for use in dumping wagons or sleighs.

The invention consists in the combinations and arrangements of parts hereinafter described and claimed.

The invention will be best understood by reference to the accompanying drawings forming a part of this specification, and in which—

Figure 1 is a side view of a vehicle dump embodying my invention, Fig. 2, a top plan view of the same, Fig. 3, a bottom plan view corresponding to Fig. 2, Fig. 4, an enlarged section taken on line $x$—$x$ of Fig. 2, and Fig. 5, an enlarged section taken on line $y$—$y$ of Fig. 2.

The preferred form of construction as illustrated in the drawings comprises a supporting platform 1 of any usual or desired construction and adapted to permit driving of a team thereon. Arranged in platform 1 is a pair of wheel tracks 2 and 3 which are connected together at their forward ends by means of a cross platform 4 as indicated. A curved sheet metal guard 4' is arranged at the forward end of platform 4 and is adapted to close the gap between the forward end of said platform 4 and platform 1 when the platform 4 is tilted or dumped as indicated in Fig. 1. Tracks 2 and 3 are pivoted for tilting or dumping on a cross rod or shaft 5 arranged under platform 1 and a supplemental sleigh dumping platform 6 is arranged within tracks 2 and 3 and is also pivoted for tilting or dumping on shaft 5 independently of tracks 2 and 3. A rock shaft 7 is arranged across the rear ends of tracks 2 and 3 and is bent to form crank arms 8 which are adapted to rest under the rear ends of said tracks and support the same from tilting, said shaft being provided at one end with an operating lever 9 for withdrawing said crank arms from supporting position and permitting the dumping or tilting of tracks 2 and 3. A cross bar 10 is arranged across the rear ends of tracks 2 and 3 immediately under sleigh platform 6 and serves to prevent dumping or tilting of platform 6 when tracks 2 and 3 are supported but permits dumping of tracks 2 and 3 independently of platform 6 as will be readily understood.

Arranged at the rear of tracks 2 and 3 and platform 6 is an upwardly swinging trap door 11 which is arranged to be swung upwardly to permit of the discharge of grain or other material from a wagon or sleigh on the device. Trap door 11 carries on its under side a locking cam or projection 12 which is adapted to engage a locking arm 13 on shaft 7 when said trap door is depressed and hold said shaft from unlocking movement, thus positively preventing tilting or dumping of the wheel tracks or sleigh platform when said trap door is closed adding to the safety of the construction.

Locking bolts or bars are slidably mounted on the under side of platform 1 in position to project under each end of platform 6 and thus lock said platform 6 from dumping or tilting. Bars 14 are operatively connected with crank arms 15 and 16 formed on an operating shaft 17 arranged on the under side of platform 1 and provided with an operating lever 18. By this arrangement it will be observed that by manipulating operating lever 18, platform 6 may be freed for dumping with tracks 2 and 3 or may be held from dumping therewith as desired.

Arranged at the rear end of track 2 is an upwardly swinging wheel stop 19 which carries a stop bar 20 slidable in said wheel track and having a stop nut 21 at its lower end adapted to limit the upward swinging of said wheel stop. A lever 22 is arranged on the under side of wheel track 2 and is provided at one end with an upwardly extending plunger 23 contacting with the under side of wheel stop 19 and adapted to elevate said wheel stop upon depression of the forward end of said lever. The forward end of lever 22 contacts with a plunger 24 carried by an upwardly swinging wheel rest 25, said parts being so arranged and weighted that the weight of wheel stop 19 overcomes the weight of the other parts, so that said wheel stop normally rests in lowered or inoperative position and wheel rest 25 normally rests in elevated or operative position as will be readily understood. By this arrangement when a wagon is driven onto wheel tracks 2 and 3, when the corresponding rear wheel rests upon wheel rest 25 the wheel stop 19 will be swung upwardly into operative position to prevent said wagon from running off of said wheel tracks when dumped or tilted as shown in Fig. 1. Cross bar 10 carries at one end a braking beam 26 operating through a suitable brake 27 which in turn is operated by a suitable hand wheel 28 as will be readily understood by those skilled in the art. Wheel guides 29 are arranged at the rear of platform 1 and are adapted to assist in guiding wheels into wheel tracks 2 and 3 as will be readily understood.

Trap door 11 is operated by means of a crank arm 30 carried by an oscillatory shaft 31 and slidably engaging a strap 32 arranged on the bottom of said door. Shaft 31 is operated by means of a lever arm 33 arranged at the side of platform 1 as shown.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vehicle dump comprising a platform; a dumping support in said platform; an upwardly swinging wheel stop on said support; a downwardly swinging wheel rest on said support positioned to be under a wheel against said stop; and an operative connection between said rest and stop, substantially as described.

2. A vehicle dump comprising a platform; a dumping support in said platform; an upwardly swinging wheel stop on said support positioned to be under said wheel support against said stop; a downwardly swinging wheel rest on said support; and an operative connection between said rest and stop, said parts being weighted to hold said stop normally in inoperative position, substantially as described.

3. A vehicle dump comprising a platform; a pair of dumping wheel tracks in said platform; a dumping sleigh platform within said wheel tracks; a shaft extending across the rear of said tracks below said platform, said shaft being bent to form crank arms adapted to engage under the ends of said tracks to support the same; an operating lever at one end of said shaft; a locking arm on said shaft; an upwardly swinging trap door at the rear of said tracks; and a locking projection on said door arranged to engage said arm when said door is closed and lock said shaft against releasing movement, substantially as described.

4. A vehicle dump comprising a platform; a pair of dumping wheel tracks in said platform; a dumping sleigh platform within said wheel tracks; a shaft extending across the rear of said tracks below said platform, said shaft being bent to form crank arms adapted to engage under the ends of said tracks to support the same; an operating lever at one end of said shaft; a locking arm on said shaft; an upwardly swinging trap door at the rear of said tracks; a locking projection on said door arranged to engage said arm when said door is closed and lock said shaft against releasing movement; a dumping platform within said tracks; and means for locking and releasing said dumping platform, substantially as described.

5. A vehicle dump comprising a platform; a pair of dumping wheel tracks in said platform; a dumping sleigh platform within said wheel tracks; a shaft extending across the rear of said tracks below said platform, said shaft being bent to form crank arms adapted to engage under the ends of said tracks to support the same; an operating lever at one end of said shaft; a locking arm on said shaft; an upwardly swinging trap door at the rear of said tracks; a locking projection on said door arranged to engage said arm when said door is closed and lock said shaft against releasing movement; a dumping platform within said tracks; a bar connecting the rear of said tracks under said dumping platform; and means for locking and releasing said dumping platform, substantially as described.

In testimony whereof I have signed my name to this specification in the presence of two subscribing witnesses.

CHRISTOPHER L. AYGARN.

Witnesses:
JOSHUA R. H. POTTS,
HELEN F. LILLIS.